United States Patent
De Los Reyes

(10) Patent No.: US 9,116,583 B1
(45) Date of Patent: Aug. 25, 2015

(54) DAMPENING THUMB MOVEMENT ON A TOUCH-SENSITIVE INPUT DEVICE

(75) Inventor: Andrew De Los Reyes, Belmont, CA (US)

(73) Assignee: GOOGLE INC., Mountain View, CA (US)

( * ) Notice: Subject to any disclaimer, the term of this patent is extended or adjusted under 35 U.S.C. 154(b) by 418 days.

(21) Appl. No.: 13/447,119

(22) Filed: Apr. 13, 2012

Related U.S. Application Data

(60) Provisional application No. 61/475,207, filed on Apr. 13, 2011.

(51) Int. Cl.
*G06F 3/044* (2006.01)
*G06F 3/0488* (2013.01)

(52) U.S. Cl.
CPC ............ *G06F 3/044* (2013.01); *G06F 3/04886* (2013.01)

(58) Field of Classification Search
CPC combination set(s) only.
See application file for complete search history.

(56) References Cited

U.S. PATENT DOCUMENTS

| | | | |
|---|---|---|---|
| 6,323,846 B1* | 11/2001 | Westerman et al. | 345/173 |
| 7,978,182 B2* | 7/2011 | Ording et al. | 345/173 |
| 2009/0174679 A1* | 7/2009 | Westerman | 345/173 |
| 2010/0141603 A1* | 6/2010 | Hotelling | 345/173 |
| 2011/0080365 A1* | 4/2011 | Westerman | 345/173 |

\* cited by examiner

*Primary Examiner* — Dwayne Bost
*Assistant Examiner* — Robert Michaud

(57) ABSTRACT

In one aspect of the present disclosure, a system for dampening movement of a thumb on the surface of a touch-sensitive input device is provided. A dampening region may be defined on the surface of the input device, within which movement of a finger detected on the surface of the input device is prohibit from causing movement of a pointer on a screen unless the speed of the detected finger exceeds a speed threshold. In one aspect, the dampening region may be divided into multiple regions where each region may have a different speed threshold. In another aspect, the speed threshold may vary, for example, as a function of location on the surface of the input device or other function.

18 Claims, 4 Drawing Sheets

DAMPENING THUMB MOVEMENT ON A TOUCH-SENSITIVE INPUT DEVICE

CROSS-REFERENCE TO RELATED APPLICATION

This application claims the benefit of U.S. Provisional Application No. 61/475,207, filed Apr. 13, 2011, entitled "DAMPENING THUMB MOVEMENT ON A TOUCH-SENSITIVE INPUT DEVICE," the disclosure of which is hereby incorporated by reference in its entirety for all purposes.

BACKGROUND

The present disclosure generally relates to dampening thumb movement on a touch-sensitive input device.

A user may input commands to a computing system (e.g., laptop) via a touch-sensitive input device (e.g., trackpad). For example, the user may move a finger across the surface of the input device to scroll a page or move a pointer displayed on the computing system. In this example, the input device may be used to track movements of the user's finger on the surface of the input device by frequently detecting the position (e.g., (x,y) coordinates) of the user's finger on the surface of the input device as the user's finger moves across the surface. The computing device may implement gesture recognition software that translates the detected positions of the user's figures into a gesture (e.g., pointer movement, scroll, etc.).

SUMMARY

In one aspect of the present disclosure, a system for dampening movement of a thumb on the surface of a touch-sensitive input device is provided. A dampening region may be defined on the surface of the input device, within which movement of a finger detected on the surface of the input device is prohibited from causing movement of a pointer on a screen unless the speed of the detected finger exceeds a speed threshold. In one aspect, the dampening region may be divided into multiple regions where each region may have a different speed threshold. In another aspect, the speed threshold may vary, for example, as a function of location on the surface of the input device or other function.

In another aspect of the present disclosure, a computer-implemented method of dampening thumb movement on a touch-sensitive input device is provided. The method includes the steps of detecting one or more movements on the touch-sensitive input device at a given time, identifying whether each of the one or more movements is a thumb movement, wherein the identifying is based on at least one of a number, a location, and a speed of the one or more movements, and prohibiting control of a pointer by each of the movements identified as a thumb movement.

In a further aspect of the present disclosure, a machine-readable storage medium comprising machine-readable instructions for causing a processor to execute a method of dampening thumb movement on a touch-sensitive input device is provided. The method includes the steps of detecting one or more movements on the touch-sensitive input device at a given time, identifying whether each of the one or more movements is a thumb movement, wherein the identifying is based on at least two of a number, a location, and a speed of the one or more movements, and prohibiting control of a pointer by the each of the movements identified as a thumb movement.

In yet another aspect of the present disclosure, a system for dampening thumb movement on a touch-sensitive input device is provided. The system includes the touch-sensitive input device and a processing unit configured detect one or more movements on the touch-sensitive input device at a given time, to determine a speed of each of the one or more movements, to identify whether each of the one or more movements is located in a dampened region of the touch-sensitive input device, and to prohibit control of the pointer by each of the movements identified as located in the dampened region unless the speed of the movement exceeds a speed threshold.

Additional features and advantages of the invention will be set forth in the description below, and in part will be apparent from the description, or may be learned by practice of the invention. The advantages of the invention will be realized and attained by the structure particularly pointed out in the written description as well as in the appended drawings.

DETAILED DESCRIPTION

In the following detailed description, numerous specific details are set forth to provide a full understanding of the present disclosure. It will be apparent, however, to one ordinarily skilled in the art that aspects of the present disclosure may be practiced without some of these specific details. In other instances, well-known structures and techniques have not been shown in detail so as not to obscure the disclosure.

Figure 1:
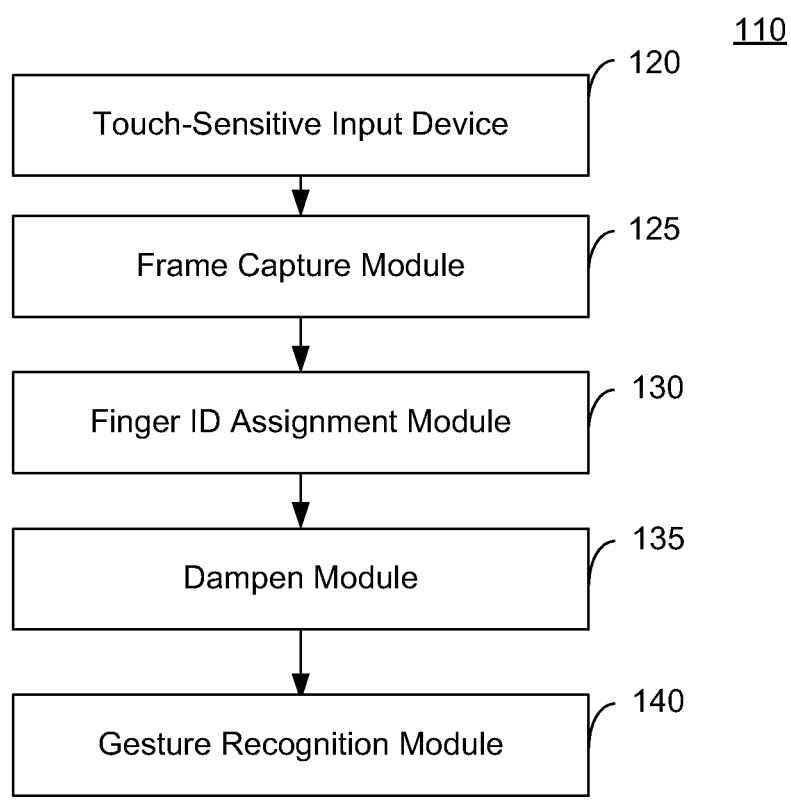
FIG. 1 is a conceptual diagram of an example system according to certain aspects of the disclosure.

FIG. 1 shows an example system 110 according to certain aspects of the disclosure. The system 110 includes a touch-sensitive input device 120, a frame capture module 125, an identification (ID) module 130, a dampen module 135, and a gesture recognition module 140. The touch-sensitive input device 120 may include a touch pad.

In one aspect, the input device 120 may detect one or more fingers on the surface of the input device 120, the position (e.g., (x,y) coordinates) of each finger on the surface of the input device 120, and a pressure of each finger, where the pressure may be defined as an area of contact with the surface of the input device 120. In some aspects, an area of contact by a finger can be approximated by a measured capacitance of the contact with the input device 120. A higher capacitance can correspond to a larger area of contact and thus a higher pressure.

In one aspect, the frame capture module 125 may sequentially capture and output frames where each frame includes the detected position (e.g., (x,y) coordinates) and pressure (e.g., contact area) of each finger on the surface of the input device 120 at a given time instance. Each frame may include additional information, such as a sequential identifier to help maintain the correct sequence of frames. The frame capture module 125 may capture the frames at a rate 80 frames per second, for example. However, the subject technology is not limited to this frame rate. The frame rate may vary depending on the manufacturer of the input device 120, the model of the input device 120, and/or other factors. The frame capture module 125 may output each captured frame to an ID module 130 for further processing, as discussed in more detail below.

In one aspect, the ID module 130 may be configured to assign an ID to each finger detected on the surface of the input device 120. When a new finger is detected in a frame, the ID module assigns a new ID to the finger and identifies the finger in subsequent frames by its assigned ID. For each frame, the ID module 130 may associate each detected position (e.g., (x,y) coordinates) in the frame with the ID assigned to the corresponding finger.

The IDs allow the gesture recognition module 140 to identify which detected positions in different frames belong to the same finger, and therefore track the movements of a particular finger using its assigned ID. For example, the gesture recognition module 140 may use the ID assigned to a finger to determine the detected positions for the finger in two consecutive frames, and infer the movement of the finger between frames based on the detected positions. The gesture recognition module 140 may then translate the movement into a gesture (e.g., pointer movement, scroll, etc.). Thus, the IDs allow the gesture recognition module 140 to identify and track individual fingers on the surface of the input device 120.

The user may move one or more fingers on the surface of the touch-sensitive input device 120 to perform various operations in a variety of different modes. For example, in a scrolling mode, the user may scroll a page on a screen by moving one or more fingers on the surface of the input device 120 in a desired direction. In a pointing mode, the user may move a pointer on the screen by moving a finger on the surface of the input device. Various aspects of the subject technology are described below using the example of the pointing mode, although it is to be understood that the subject technology is not limited to the pointing mode and may be applied to other modes.

Figure 2:
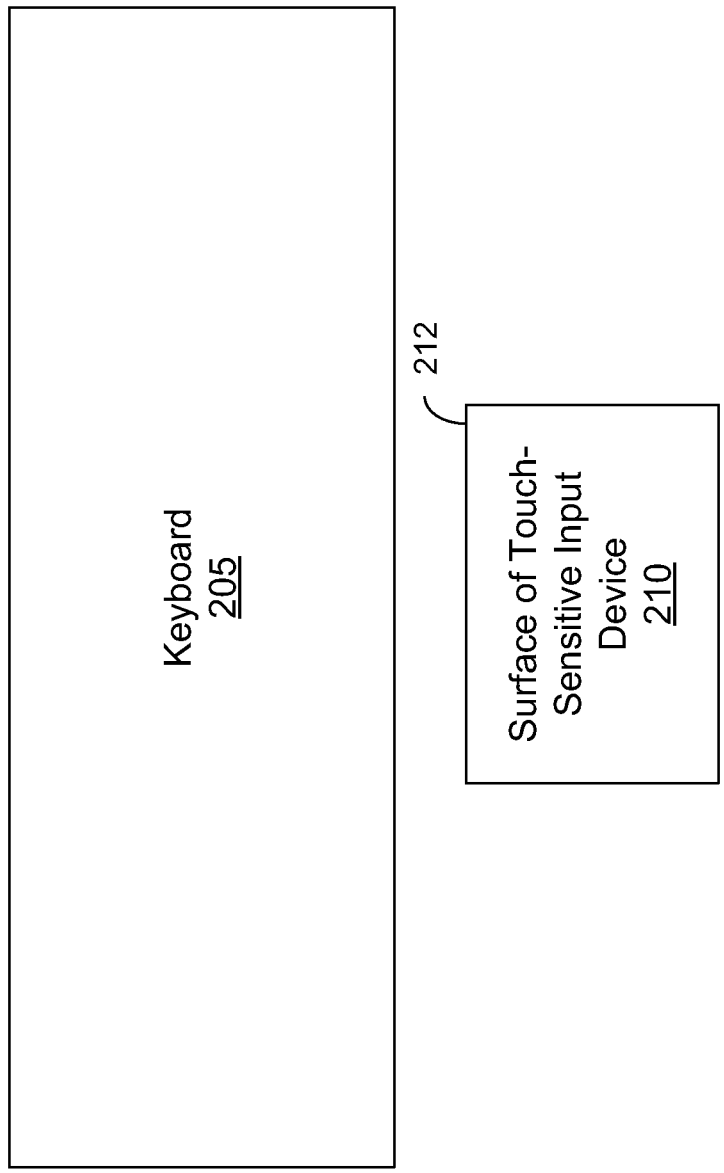
FIG. 2 shows an example of a layout of a keyboard and a touch-sensitive input device according to certain aspects of the disclosure.

In one aspect, when only one finger is on the surface of the input device 120, the gesture recognition module 140 may move the pointer according to movements of the finger on the surface of the input device 120. When multiple fingers are on the surface of the input device 120, the gesture recognition module 140 may control movements of the pointer according to movements of the uppermost finger on the surface of the input device 120. In one aspect, the uppermost finger may correspond to the finger located closest to a keyboard located above the input device 120. FIG. 2 shows an example of a physical layout of the keyboard 205 and the input device 120 (e.g., touch pad), in which the keyboard 205 is located above the surface 210 of the input device 120. In this example, the gesture recognition module 140 may determine the uppermost finger based on the finger located closest to a top edge 212 of the input device 120.

Controlling pointer movements based on movements of the uppermost finger may be desirable for the user. For example, when the user is moving a finger on the surface 210 of the input device 120 to control movement of the pointer, the user may rest a thumb at the bottom of the input device 120. In this example, the gesture recognition module 140 may detect two fingers on the surface 210 of the input device 120 (the moving finger and the resting thumb). Since the moving finger normally stays above the thumb resting at the bottom of the input device 120, the moving finger corresponds to the uppermost finger detected by the gesture recognition module 140. Thus, in this case, the gesture recognition module 140 moves the pointer according to the movements of the finger that the user intends to control the pointer.

However, this approach may result in unintentional pointer movements in some cases. For example, the user may want to move the pointer a large distance across the screen (e.g., down and to the right). In this example, the user may have a tendency to rest a thumb at the bottom on the input device 120 while performing this task. Because the distance the user wants to move the pointer is large, the user may sweep a finger across the surface 210 of the input device 120 multiple times to move the pointer. For example, the user may move an airborne finger to the upper left area of the surface 210 of the input device 120, touch down on the surface 210 with the finger, and swipe the finger across the surface 210 to the bottom right area of the surface 210. The user may then lift the finger off of the surface 210, move the finger back to the upper left area of the surface 210, touch down again with the finger, and swipe the finger again across the surface 210 to the bottom right area of the surface 210. During this entire time, the thumb may be resting at the bottom of the input device 120 and partially touching the surface 210 of the input device 120.

In this example, the gesture recognition module 140 will detect one or two fingers on the surface 210 of the input device 120 at different times. When both the finger and the thumb are on the surface 210 of the input device 120 (e.g., when the finger is swiped across the surface 210), the gesture recognition module 140 detects two fingers. When only the thumb is on the surface 210 of the input device 120 (e.g., when the finger is lifted above the surface 210 between swipes), the gesture recognition module 140 detects only one finger at the location of the thumb.

In this example, when the finger is on the surface 210 of the input device 120, the gesture recognition module 140 uses the finger to control movement of the pointer since the finger normally stays above the thumb resting at the bottom of the input device 120 and therefore corresponds to the uppermost finger. Thus, when the finger is on the surface 210, the gesture recognition module 140 moves the pointer as the user expects. However, when only the thumb is on the surface 210 of the input device (e.g., when the finger is lifted above the surface 210 between swipes), the gesture recognition module 140 detects the thumb as the uppermost finger and therefore uses the thumb to control movement of the pointer. This can lead to unintentional pointer movements between swipes.

This is because, when the user moves the finger above the surface 210 of the input device 120 between swipes, the thumb may roll a bit on the surface 210 of the input device 120. The gesture recognition module 140 may detect the thumb roll, and move the pointer in response to the thumb roll. This is because the thumb can often be the uppermost finger detected on the surface 210 between swipes. In this example, the user may see a large pointer movement from the first swipe, then a small movement backwards from the thumb roll, and then another large pointer movement from the second swipe. The small movement backwards is unexpected since the user did not intend to move the pointer with the thumb.

Figure 3A:
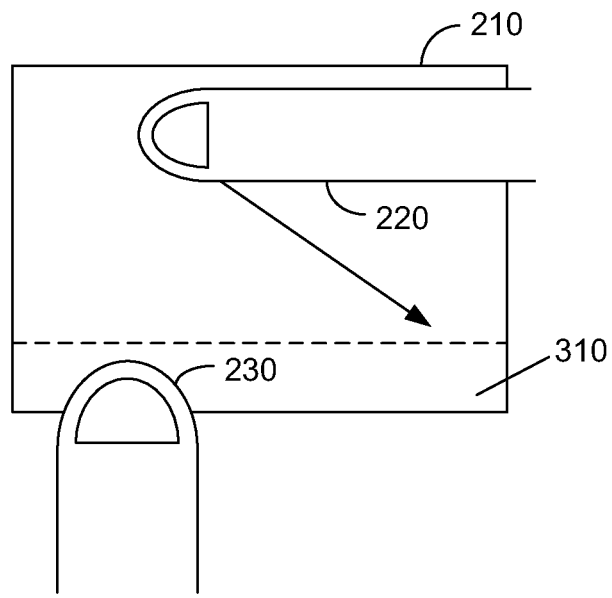
FIG. 3A shows an example of a finger swiping across the surface of the input device and a thumb within a dampening region of the surface of the input device according to certain aspects of the disclosure.
Figure 3B:
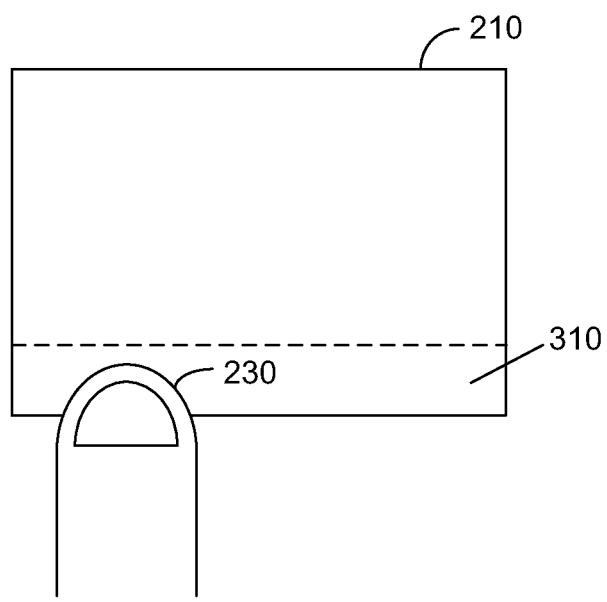
FIG. 3B shows an example of the thumb within the dampening region after the finger has been lifted off of the surface of the input device between swipes according to certain aspects of the disclosure.

To address this problem, in one aspect, a dampened region 310 may be defined along a bottom edge of the surface 210 of the input device 120 (e.g., touch pad), as shown in the examples in FIGS. 3A and 3B. In this aspect, the dampen module 135 may detect when a finger on the surface 210 is located within the dampened region 310 and prohibit the finger from moving the pointer unless the speed of the finger exceeds a speed threshold. The speed threshold may be chosen to be high enough to suppress small accidental movements (e.g., thumb roll) within the dampened region 310, but not high enough to suppress larger intended movements (e.g., finger swipe). The speed threshold may be determined empirically, for example. The speed of a finger within the dampened region 310 may be determined by computing a distance between the positions (e.g., (x/y) coordinates) of the finger in two consecutive frames and dividing the distance by the time difference between the two consecutive frames. In one example, the speed threshold may be equal to W/(768 milliseconds), where W is the width of the input device 120. The speed threshold may be varied or optimized based on empirical data and/or the dimensions of the input device 120.

In one aspect, once the speed of a finger within the dampened region 310 exceeds the speed threshold, the dampen module 135 may allow the finger to continue to control pointer movements even if the speed of the finger subsequently slows below the speed threshold. Thus, the dampen module 135 may generate an indicator indicating that the finger is allowed to control pointer movements once the finger exceeds the speed threshold one time.

FIGS. 3A and 3B show an example in which the dampened region 310 may be used to suppress unintentional pointer movements from a thumb 230 resting at the bottom of the input device 120. In this example, the thumb 230 is located within the dampened region 310. In FIG. 3A, the user may swipe a finger 220 across the surface 210 in the direction indicated by the arrow to move the pointer on the screen down and to the right. In this example case, the finger 220 is above the thumb 230 and therefore controls movement of the pointer. In FIG. 3B, the finger 220 is lifted above the surface 210 of the input device 120 between swipes. In this case, only the thumb 230 is on the surface 210 of the input device 120. If the user rolls the thumb 230 between swipes, then the dampen module 135 prevents the thumb roll from moving the pointer assuming that the speed of the thumb roll is below the speed threshold. as a result, the thumb 230 is prevented from causing unintentional pointer movements between swipes.

In one aspect, when a finger within the dampened region 310 crosses the speed threshold, but subsequently slows below the speed threshold, the dampen module 135 may re-dampen the finger. Thus, after slowing below the speed threshold, the finger within the dampened region 310 is required to cross the speed threshold again to cause pointer movements.

In one aspect, the speed threshold may vary depending on the location on the surface 210 of the input device 120. For example, the dampened region 310 may be divided into multiple regions where each region may have a different speed threshold. In another example, the speed threshold may vary as a function of location in one or two dimensions (e.g., vary as a function of the y coordinate, x coordinate, or both coordinates). The speed threshold may vary continuously or discretely as a function of location. In one aspect, the speed threshold may vary across the entire surface 210 of the input device 120 with no exact boundaries for a dampened region.

In an alternative aspect, the dampen module 135 may prohibit any finger on the surface 210 of the input device 120 or any finger within the dampened region 310 from causing pointer movements for a short period of time after the number of fingers detected on the surface 210 of the input device 120 changes. For example, when the finger 220 is lifted off of the surface 210 of the input device 120 between swipes, the number of detected fingers changes from two to one. In this example, the dampen module 135 may prohibit any finger on the surface 210 or any finger within the dampened region 310 from causing pointer movements for a short period of time, thereby preventing the thumb 230 from causing pointer movements during this time. By the time the short period of time is up, the finger 220 may touch down on the surface 210 again to begin the next swipe. In this aspect, the period of time may be determined empirically (e.g., based on an average time between consecutive swipes and/or other factor).

In another alternative aspect, in a case that more than one finger is detected, the dampen module 135 may identify a finger with a pressure that is higher than a pressure of another of the fingers by more than a predetermined threshold (e.g., as a thumb). In this aspect, that finger (e.g., identified as a thumb) can be prohibited from controlling the pointer. For one example, different finger pressures can be compared by measuring the pressures, calculating a difference between the measured pressures, and comparing the difference to a predetermined threshold. For another example, different finger pressures can be compared by measuring the pressures, dividing one measured pressure by another measured pressure, and comparing the quotient to a predetermined threshold. In some aspects, once a finger is prohibited from causing pointer movements, the finger can be prohibited from causing pointer movements until lifted from the input device.

Figure 4:
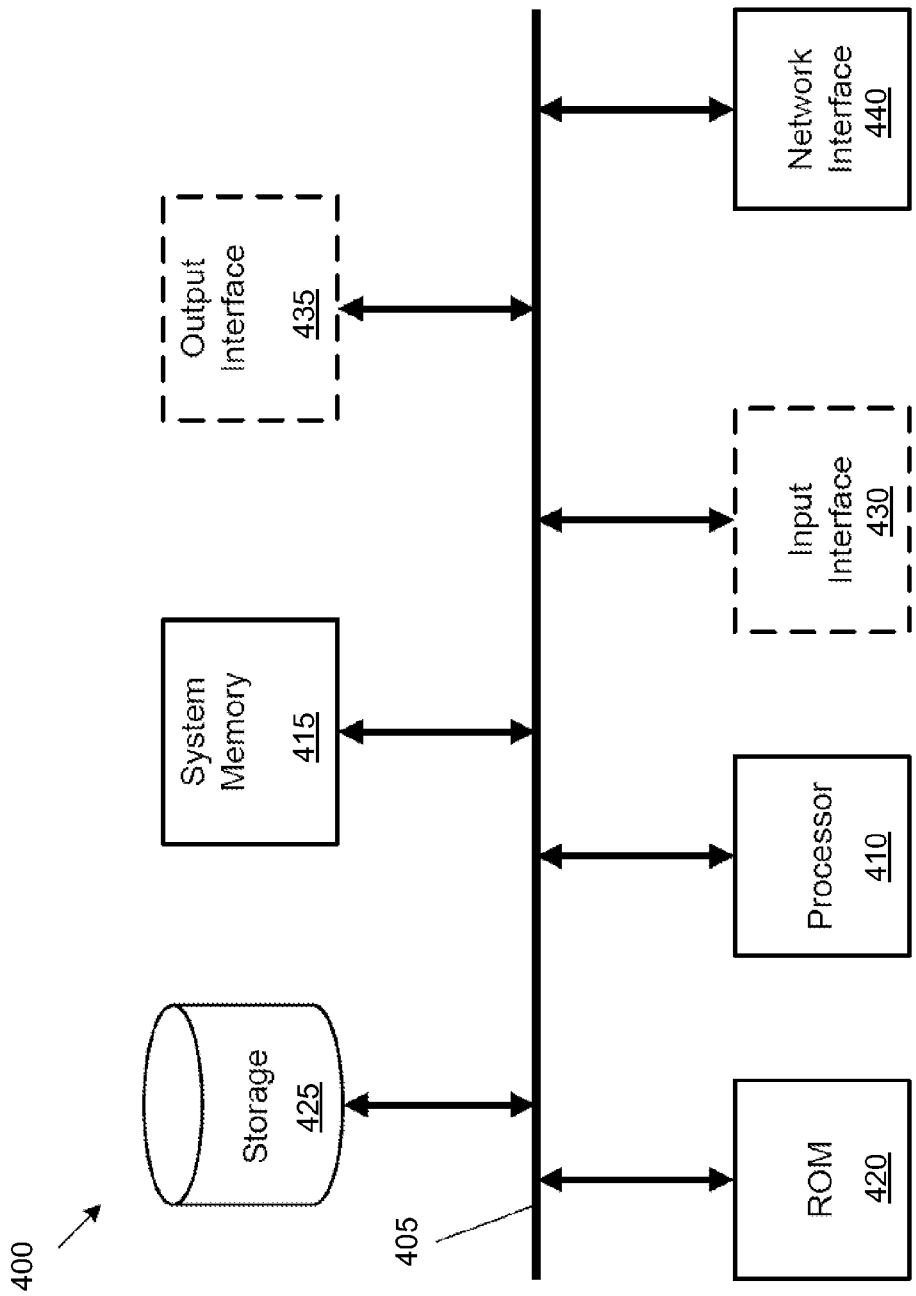
FIG. 4 is a block diagram illustrating an example computer system with which the system of FIG. 1 can be implemented.

FIG. 4 illustrates an example computing system 400 with which some implementations of the subject technology may be implemented. The system 400 can be a computer, a phone, a PDA, a tablet, or any other sort of electronic device. Such a system 400 includes various types of computer readable media and interfaces for various other types of computer readable media. The system 400 may include a bus 405, processing unit(s) 410, a system memory 415, a read-only memory 420, a storage device 425, an input interface 430, an output interface 435, and a network interface 440.

The bus 405 collectively represents all system, peripheral, and chipset buses that communicatively connect the numerous internal devices of the system 400. For instance, the bus 405 communicatively connects the processing unit(s) 410 with the read-only memory 420, the system memory 415, and the storage device 425.

From these various memory units, the processing unit(s) 410 may retrieve instructions and execute the instructions to perform various functions described above. For example, the processing units(s) may execute instructions to perform the functions of the various modules illustrated in FIG. 1. The processing unit(s) can be a single processor or a multi-core processor in different implementations.

The read-only-memory (ROM) 420 may store static data and instructions that are needed by the processing unit(s) 410 and other modules of the system 400. The storage device 425, on the other hand, may be a read-and-write memory device. This device may comprise a non-volatile memory unit that stores instructions and data even when the system 400 is powered down. Some implementations of the invention may use a mass-storage device (such as a magnetic or optical disk and its corresponding disk drive) as the storage device 425.

Other implementations may use a removable storage device (such as a flash drive, a floppy disk, and its corresponding disk drive) as the storage device 425. The system memory 415 may be a volatile read-and-write memory, such as a random access memory. The system memory 415 may store some of the instructions and data that the processor needs at runtime. In some implementations, instructions for executing various processes described above may be stored in the system memory 415, the storage device 425, and/or the read-only memory 420.

The bus 405 may also connect to the input interface 430 and the output interface 435. The input interface 430 may include the touch-sensitive input device 120. The output interface 435 can provide display images generated by the system 400. The optional output interface 435 can interface with printers and display devices, such as cathode ray tubes (CRT) or liquid crystal displays (LCD). Some implementations can interface with devices such as a touchscreen that functions as both input and output devices.

The bus 405 may also couple the system 400 to a network interface 440 through a network adapter (not shown). In this manner, the computer can be a part of a network of computers (such as a local area network ("LAN"), a wide area network ("WAN"), or an Intranet, or an interconnected network of networks, such as the Internet. Any or all components of system 400 can be used in conjunction with the invention.

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products.

These and other implementations are within the scope of the following claims.

What is claimed is:

1. A computer-implemented method of dampening thumb movement on a touch-sensitive input device, comprising:
    detecting one or more movements on the touch-sensitive input device at a given time;
    identifying whether each of the one or more movements is a thumb movement, wherein:
        the identifying is based on at least one of a number, a location, and a speed of the one or more movements,
        in a case where the movement is located in dampened region of the touch sensitive input device, the movement is identified as a thumb movement unless the speed of the movement exceeds a speed threshold, and
        the dampened region comprises multiple regions of the touch-sensitive input device and each of the multiple regions has a different speed threshold from each other; and
    prohibiting control of a pointer by each of the movements identified as a thumb movement.

2. The computer-implemented method of claim 1, wherein in a case where the number of the one or more movements is two, an uppermost of the movements is not identified as a thumb movement.

3. The computer-implemented method of claim 2, wherein the uppermost of the movements is closest to a keyboard located above the touch-sensitive input device.

4. The computer-implemented method of claim 1, wherein the speed threshold varies as a function of one or two dimensions across the touch-sensitive input device.

5. The computer-implemented method of claim 1, wherein in a case where the number of the one or more movements on the touch-sensitive input device changes, each of the movements is identified as a thumb movement.

6. The computer-implemented method of claim 1, further comprising determining pressures of the one or more movements on the touch-sensitive input device;
    wherein, in a case where the number of the one or more movements is more than one, a movement with a pressure that is higher than a pressure of another movement by more than a predetermined threshold is identified as a thumb movement.

7. The computer-implemented method of claim 1 further comprising prohibiting control of the pointer for a period of time after a number of the movements detected on the touch-sensitive input device changes.

8. A non-transitory machine-readable storage medium comprising machine-readable instructions for causing a processor to execute a method of dampening thumb movement on a touch-sensitive input device, the method comprising:
    detecting one or more movements on the touch-sensitive input device at a given time;
    identifying whether each of the one or more movements is a thumb movement, wherein:
        the identifying is based on at least two of a number, a location, and a speed of the one or more movements,
        in a case where the movement is located in dampened region of the touch sensitive input device, the movement is identified as a thumb movement unless the speed of the movement exceeds a speed threshold, and
        the dampened region comprises multiple regions of the touch-sensitive input device and each of the multiple regions has a different speed threshold from each other; and
    prohibiting control of a pointer by the each of the movements identified as a thumb movement.

9. The non-transitory machine-readable storage medium of claim 8, wherein in a case where the number of the one or more movements is two, an uppermost of the movements is not identified as a thumb movement.

10. The non-transitory machine-readable storage medium of claim 9, wherein the uppermost of the movements is a movement closest to a keyboard located above the touch-sensitive input device.

11. The non-transitory machine-readable storage medium of claim 8, wherein the speed threshold varies as a function of one or two dimensions across the touch-sensitive input device.

12. The non-transitory machine-readable storage medium of claim 8, wherein in a case where the number of the one or more movements on the touch-sensitive input device changes, each of the movements is identified as a thumb movement.

13. The non-transitory machine-readable storage medium of claim 8, wherein the method further comprises determining pressures of the one or more movements on the touch-sensitive input device; and
    wherein, in a case where the number of the one or more movements is more than one, a movement with a pressure that is higher than a pressure of another movement by more than a predetermined threshold is identified as a thumb movement.

14. The non-transitory machine-readable storage medium of claim 9, wherein the method further comprises prohibiting control of the pointer for a period of time after a number of the movements detected on the touch-sensitive input device changes.

15. A system for dampening thumb movement on a touch-sensitive input device, the system comprising:
   the touch-sensitive input device; and
   a processing unit configured to:
      detect one or more movements on the touch-sensitive input device at a given time;
      determine a speed of each of the one or more movements;
      identify whether each of the one or more movements is located in a dampened region of the touch-sensitive input device; and
      prohibit control of the pointer by each of the movements identified as located in the dampened region unless the speed of the movement exceeds a speed threshold, wherein the dampened region comprises multiple regions of the touch-sensitive input device and each of the multiple regions has a different speed threshold from each other.

16. The system of claim 15, wherein the speed threshold varies as a function of one or two dimensions across the touch-sensitive input device.

17. The system of claim 15, wherein the processing unit is further configured to prohibit control of the pointer by the movements in a case that the number of the one or more movements changes.

18. The system of claim 15, wherein the processing unit is further configured to prohibit control of the pointer for a period of time after a number of the movements detected on the touch-sensitive input device changes.

* * * * *

UNITED STATES PATENT AND TRADEMARK OFFICE
CERTIFICATE OF CORRECTION

PATENT NO. : 9,116,583 B1
APPLICATION NO. : 13/447119
DATED : August 25, 2015
INVENTOR(S) : Andrew De Los Reyes Page 1 of 1

It is certified that error appears in the above-identified patent and that said Letters Patent is hereby corrected as shown below:

Claims

In column 9, line 5, in claim 14, delete "claim 9," and insert -- claim 8, --, therefor.

Signed and Sealed this
Ninth Day of February, 2016

Michelle K. Lee
*Director of the United States Patent and Trademark Office*